United States Patent
ten Broeke et al.

(10) Patent No.: US 9,581,093 B2
(45) Date of Patent: Feb. 28, 2017

(54) BI-FUEL SYSTEM AND A METHOD FOR OPERATING SUCH A SYSTEM

(71) Applicant: INDOPAR B.V., Eindhoven (NL)

(72) Inventors: Sebastiaan M. E. ten Broeke, Nijnsel (NL); Jeroen Visscher, Nijmegen (NL)

(73) Assignee: INDOPAR B.V., Eindhoven (NL)

( * ) Notice: Subject to any disclaimer, the term of this patent is extended or adjusted under 35 U.S.C. 154(b) by 0 days.

(21) Appl. No.: 14/954,735

(22) Filed: Nov. 30, 2015

(65) Prior Publication Data

US 2016/0084172 A1    Mar. 24, 2016

Related U.S. Application Data

(63) Continuation of application No. PCT/NL2014/050348, filed on May 30, 2014.

(30) Foreign Application Priority Data

May 30, 2013    (NL) ...................................... 2010897

(51) Int. Cl.
| | | |
|---|---|---|
| F02M 37/00 | (2006.01) | |
| F02M 21/00 | (2006.01) | |
| F02D 19/08 | (2006.01) | |
| F02D 19/06 | (2006.01) | |
| F02D 41/00 | (2006.01) | |
| F02D 41/38 | (2006.01) | |
| F02M 25/00 | (2006.01) | |

(52) U.S. Cl.
CPC ....... *F02D 19/081* (2013.01); *F02D 19/0628* (2013.01); *F02D 19/0647* (2013.01); *F02D 19/0665* (2013.01); *F02D 19/0678* (2013.01); *F02D 19/0681* (2013.01); *F02D 19/0684* (2013.01); *F02D 19/0689* (2013.01); *F02D 19/087* (2013.01); *F02D 41/0025* (2013.01); *F02D 41/3845* (2013.01); *F02M 25/00* (2013.01); *Y02T 10/36* (2013.01)

(58) Field of Classification Search
CPC .............. F02D 19/081; F02D 19/0681; F02D 19/0665; F02D 19/0684; F02D 19/0687; F02D 19/0647; F02D 19/0689; F02D 19/0628; F02D 19/0678; F02D 41/3845; F02D 41/0025; F02M 25/00; Y02T 10/36
USPC ............ 123/525, 27 GE, 431, 575, 514, 515
See application file for complete search history.

(56) References Cited

U.S. PATENT DOCUMENTS

| | | | | |
|---|---|---|---|---|
| 2,767,691 | A | * 10/1956 | Mengelkamp | ............ F02B 7/00 123/1 A |
| 9,097,227 | B2 | * 8/2015 | Nishikawa | ............. F02M 37/00 |
| 2009/0188479 | A1 | 7/2009 | Haudel | |

FOREIGN PATENT DOCUMENTS

| | | |
|---|---|---|
| DE | 102007028816 A1 | 5/2008 |
| DE | 102007051677 A1 | 4/2009 |

(Continued)

*Primary Examiner* — Hai Huynh
(74) *Attorney, Agent, or Firm* — Seed IP Law Group LLP

(57) ABSTRACT

The invention relates to a bi-fuel system (100) and a method for operating such a system, in which the following steps are performed by a control system (104) being part of the bi-fuel system (100): determining whether a relative amount of first fuel in the second fuel tank (2) is less than a predetermined minimum relative amount of first fuel in the second fuel tank (MIX %_min), and if said relative amount is less than MIX %_min, supplying first fuel via the fuel return line (18) to the second fuel tank (2), by temporarily opening the return line shut-off valve (12).

16 Claims, 1 Drawing Sheet

(56) References Cited

FOREIGN PATENT DOCUMENTS

| | | |
|---|---|---|
| EP | 2 143 916 A1 | 1/2010 |
| EP | 2 341 234 A2 | 7/2011 |
| JP | 2002327658 A | 11/2015 |
| WO | 2008/036999 A1 | 4/2008 |

* cited by examiner

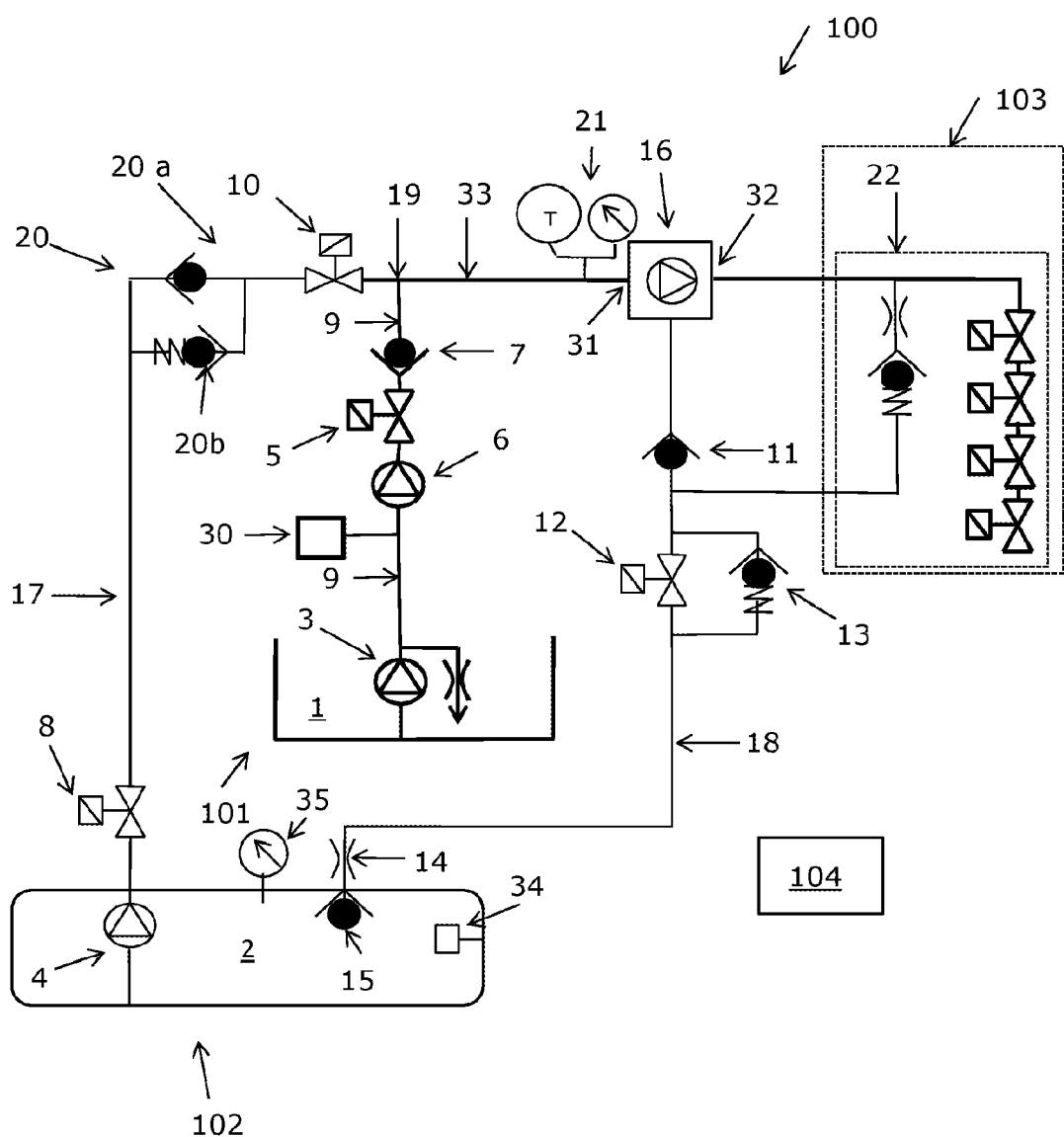

BI-FUEL SYSTEM AND A METHOD FOR OPERATING SUCH A SYSTEM

The present invention relates to a bi-fuel system comprising a first, liquid, fuel subsystem and a second, liquefied, fuel subsystem.

EP 2 341 234 discloses a direct injection bi-fuel system comprising a petrol subsystem and an LPG subsystem, which system is arranged for switching between LPG being provided to a direct injection combustion engine during an LPG consuming mode, and petrol being provided to said engine during a petrol consuming mode.

Although the system disclosed in EP 2 341 234 functions satisfactorily in most cases, an object of the present invention is to further improve the durability of the system and to decrease the impact of the system on the durability of a direct injection engine combustion engine which is operatively connected to the bi-fuel system.

Said object is achieved by the bi-fuel system according to the present invention, as defined in claim 1, comprising a first, liquid, fuel subsystem and a second, liquefied, fuel subsystem, wherein the system is arranged for switching between a second, liquefied, fuel—first, liquid, fuel mixture being provided to an internal combustion engine during a second, liquefied, fuel consuming mode, and first fuel being provided to said engine during a first, liquid, fuel consuming mode, the first fuel subsystem comprising
  a first fuel tank,
  a first fuel pump for pumping first fuel from the first fuel tank through a first fuel line towards a junction,
the second fuel subsystem comprising
  a second fuel tank, and
  a second fuel pump for pumping second fuel from the second fuel tank through a second fuel line towards the junction,
the system further comprising:
  a fuel line which is connected with an upstream end thereof, at the junction, to the second fuel line and to the first fuel line, and which is operatively connected with a downstream end thereof to the engine,
  a fuel return line which is operatively connected with an upstream end thereof to the fuel line, a downstream end of the fuel return line opening out into the second fuel tank,
  a shut-off valve which is arranged in the fuel return line, wherein in second fuel consuming mode, the shut-off valve is open so that part of the second fuel supplied to the engine is circulated back to the second fuel tank via the fuel return line, and
  a control system which is arranged for performing the following steps:
    determining whether a relative amount of first fuel in the second fuel tank is less than a predetermined minimum relative amount of first fuel in the second fuel tank (MIX %_min), and
    if said relative amount is less than MIX %_min, supplying first fuel via the fuel return line to the second fuel tank, by temporarily opening the return line shut-off valve.

An advantage of the bi-fuel system according to the invention is that as a result of the above steps as included in claim 1, of the control system being arranged for determining whether a relative amount of first fuel in the second fuel tank is less than a predetermined minimum relative amount of first fuel in the second fuel tank (MIX %_min), and if said relative amount is less than MIX %_min, supplying first fuel via the fuel return line to the second fuel tank, by temporarily opening the return line shut-off valve, is that it can be ensured that at all times a relative amount of first fuel is supplied to the combustion engine. In first fuel consuming mode normally with a relative amount of first fuel of 100 percent, and in second fuel consuming mode at least with a relative amount of first fuel of the predetermined minimum relative amount of first fuel. Due to this, for example, valve clearance deterioration for both the inlet and exhaust valves is decreased and valve seats remain in good condition for a longer time, i.e. durability is increased. Further, due to the first fuel, lubrication of all components of the fuel system and the engine, which come in direct contact with the fuel, such as fuel pumps, valves, and fuel injectors, is improved. Also, fuel degradation as a result of a relatively long residence time in the first fuel subsystem is avoided because at all times a relative amount of first fuel is used. Hence, the durability of the fuel system is improved and the impact of the fuel system on durability of a direct injection engine combustion engine which is operatively connected to the bi-fuel system, is decreased. If said determined relative amount is however not less than MIX %_min, no action is needed.

Preferably, the control system, for the purpose of determining whether the relative amount of first fuel in the second fuel tank is less than the predetermined minimum relative amount of first fuel in the second fuel tank (MIX %_min), is arranged for performing the following steps:
  a) determining the relative amount of first fuel (MIX %) in the second fuel tank, and
  b) comparing MIX % with the predetermined minimum relative amount of first fuel in the second fuel tank (MIX %_min).

By doing so, it can be ensured that at all times a relative amount of first fuel is supplied to the combustion engine, while due to the fact that the value of MIX % is actually determined, it is possible to adapt the step of supplying first fuel via the fuel return line to the second fuel tank, for example, to the difference between MIX % and MIX %_min.

In an embodiment, the control system, for the purpose of supplying first fuel via the fuel return line to the second fuel tank, by temporarily opening the return line shut-off valve, is arranged for supplying first fuel via the fuel return line to the second fuel tank while in first fuel consuming mode, by temporarily opening the return line shut-off valve.

Preferably, the first fuel pump is constituted by a first first fuel pump which is provided in the first fuel tank, the system further comprising:
  a second first fuel pump connected in series to the first first fuel pump for increasing first fuel pressure generated by the first first fuel pump, so that by means of the first and second first fuel pump, in use first fuel from the first fuel tank can be pumped through the first fuel line towards the junction. This way, a fuel pump in the first fuel tank can be designed to be smaller, or, can be left unamended, for example in case of retrofitting a second fuel subsystem onto a vehicle already equipped with a first fuel subsystem, normally a petrol subsystem. This is because the second first fuel pump increases first fuel pressure generated by the first first fuel pump.

Preferably, the fuel line is operatively connected with a downstream end thereof to a fuel rail of the engine. The engine may in an embodiment be equipped with a first fuel rail for supplying first fuel, from the first fuel line, to injectors such as at the intake ports of the cylinders of the engine, and with a second fuel rail for supplying the mixture, from the fuel line, to further injectors such as at the intake ports of the cylinders of the engine, the fuel return line preferably being connected with its upstream end to the second fuel rail. This way, first fuel can be fed to the engine via the first fuel rail. First fuel can also be supplied to the second fuel tank via the fuel line and the fuel return line, and via the second fuel rail.

In a highly preferred embodiment, the system is a direct injection bi-fuel system, and further comprises:
a high pressure pump having an inlet and a high pressure outlet, the outlet being connected to a high pressure fuel rail of a direct injection combustion engine, wherein
the fuel line is connected with the upstream end thereof, at the junction, to the second fuel line and to the first fuel line, and connected with the downstream end thereof to the inlet of the high pressure pump, and wherein
the fuel return line is operatively connected with the upstream end thereof to the fuel line at or near the inlet of the high pressure pump.

In an embodiment, the second fuel subsystem further comprises fuel amount determining means arranged for determining the total amount of liquid fuel in the second fuel tank, i.e. the total amount of the mixture of any first, liquid, fuel and any second, liquefied, fuel, and wherein the predetermined minimum relative amount of first fuel in the second fuel tank (MIX %_min) is each time the relative amount in the second fuel tank before a positive change in the total amount of liquid fuel in the second fuel tank is determined using the fuel amount determining means. That means that in use of a vehicle equipped with a system according to this embodiment, at all times after a second fuel tank refill such as at a gas station, the relative amount of first fuel in the second fuel tank is less than MIX %_min. Thus, in other words, the control system is in that case arranged for determining a positive change in the total amount of liquid fuel in the second fuel tank using the fuel amount determining means, and for subsequently supplying first fuel via the fuel return line to the second fuel tank, by temporarily opening the return line shut-off valve. For example, an amount of between 0, 1 and 2 liter of first fuel is supplied to the second fuel tank. Thus, the invention relates to a bi-fuel system comprising a first, liquid, fuel subsystem and a second, liquefied, fuel subsystem, wherein the system is arranged for switching between a second, liquefied, fuel—first, liquid, fuel mixture being provided to an internal combustion engine during a second, liquefied, fuel consuming mode, and first fuel being provided to said engine during a first, liquid, fuel consuming mode,
the first fuel subsystem comprising
a first fuel tank,
a first fuel pump for pumping first fuel from the first fuel tank through a first fuel line towards a junction,
the second fuel subsystem comprising
a second fuel tank,
a second fuel pump for pumping second fuel from the second fuel tank through a second fuel line towards the junction, and
fuel amount determining means arranged for determining the total amount of liquid fuel in the second fuel tank,
the system further comprising:
a fuel line which is connected with an upstream end thereof, at the junction, to the second fuel line and to the first fuel line, and which is operatively connected with a downstream end thereof to the engine,
a fuel return line which is operatively connected with an upstream end thereof to the fuel line, a downstream end of the fuel return line opening out into the second fuel tank,
a shut-off valve which is arranged in the fuel return line, wherein in second fuel consuming mode, the shut-off valve is open so that part of the second fuel supplied to the engine is circulated back to the second fuel tank via the fuel return line, and
a control system which is arranged for performing the following steps:
determining a positive change in the total amount of liquid fuel in the second fuel tank using the fuel amount determining means, and subsequently
supplying first fuel via the fuel return line to the second fuel tank, by temporarily opening the return line shut-off valve.

The first, liquid, fuel is preferably petrol, or, gasoline. Alternatively, the first fuel may be diesel.

The second, liquefied, fuel is preferably Liquefied Petroleum Gas, or, LPG. Alternatively, the second fuel may be an Ether such as preferably Dimethyl ether (DME).

In an embodiment, the second fuel subsystem further comprises fuel amount determining means, arranged for determining the total amount of liquid fuel in the second fuel tank, and the control system, for the purpose of performing the above mentioned step a), is arranged for determining MIX % by recalculating MIX % based on a value of MIX % which was previously stored in a memory of said control system and based on a change in said amount of liquid fuel in the second fuel tank subsequent to said previous storing of MIX %, which change of said amount of liquid fuel is determined by the fuel amount determining means.

The fuel amount determining means may comprise a liquid fuel level sensor for determining the fuel level in the second fuel tank. Alternatively, the fuel amount determining means may comprise en electronic level metering element such as a capacitive metering element. The total amount of liquid fuel in the second fuel tank can then be determined by calculating it from a measured fuel level and stored information on the relation between level and volume, which is dependent on the specific fuel tank.

In an embodiment, the first fuel subsystem preferably further comprises a first fuel shut-off valve being arranged in the first fuel line, the second fuel subsystem further comprises a second fuel shut-off valve being arranged in the second fuel line, and the bi-fuel system further comprises a flow limiting element arranged in the return line, arranged for limiting flow through the return line, and a pressure sensor connected to the hydraulic circuit part between the first fuel shut-off valve, or the first fuel pump in case no first fuel shut-off valve would be present in the first fuel line, the second fuel shut-off valve, and the flow limiting element, for determining fuel pressure in said circuit part, wherein the control system is further arranged for determining the amount of first fuel flowing through the flow limiting element during the above mentioned step of supplying first fuel via the fuel return line to the second fuel tank by temporarily opening the return line shut-off valve, using the fuel pressure determined by the pressure sensor, and a fuel pressure in the second fuel tank. Preferably the fuel pressure sensor is located near the inlet of the high pressure pump. In an other preferred embodiment it is located between the shut-off valve in the fuel return line and the flow limiting element. The fuel pressure in the second fuel tank can be obtained from a mathematical model of the second fuel tank as part of the bi-fuel system, or from a measured signal from a further fuel pressure sensor arranged for measuring fuel pressure inside the second fuel tank. The flow limiting element is preferably constituted by a hydraulic restriction, preferably an orifice.

Preferably, the control system is arranged for performing the following additional steps if following the above mentioned step b) it is established that MIX % is less than MIX %_min:

determining the required amount of first fuel to be supplied to the second fuel tank (V_req) so as to increase MIX % in the second fuel tank to at least MIX %_min, comparing said determined required amount of first fuel (V_req) with the maximum amount of fuel that can still be added to the second fuel tank (V_max_ad), and if V_req is larger than V_max_ad, intermittently supplying a volume of first fuel to the high pressure pump while driving in second fuel consuming mode, by intermittently switching to first fuel consuming mode and closing the return line shut-off valve, which volume of first fuel supplied to the high pressure pump is each time such that in the fuel rail, MIX % is larger than MIX %_min at all times. By doing so, a lower than desired MIX % in the second fuel tank in combination with a completely filled second fuel tank, does not result in the fact that MIX % in the high pressure fuel rail decreases more than desired, since in this case first fuel is intermittently supplied directly to the high pressure pump and thus to the high pressure fuel rail. The amount of first fuel entering the fuel rail may be determined based on a calculation of consumed fuel while being in first fuel consuming mode. Said calculation may be based on stored engine performance maps in combination with measured signals such as engine inlet air pressure, engine speed an throttle information.

In a preferred embodiment, the control system, if V_req is larger than V_max_ad, is arranged for, additional to the step of intermittently supplying a volume of first fuel to the high pressure pump, supplying an amount of first fuel equal to V_max_ad to the second fuel tank while in first fuel consuming mode, by temporarily opening the return line shut-off valve. By doing so, the space, albeit less than optimal, in the second fuel tank is used to increase MIX % in the second fuel tank, while by directly supplying first fuel to the high pressure pump intermittently, MIX % in the fuel rail is kept at a desired level.

Preferably, the predetermined minimum relative amount of first fuel in the second fuel tank (MIX %_min) is two percent, preferably at least five percent. Dependent on the specific situation (such as vehicle, engine type and load conditions) a higher minimum relative amount such as up to 10 percent may be preferable. By "relative amount of first fuel" is meant the ratio of the amount of first fuel to the total amount of fuel in the mixture.

Preferably, the step of supplying first fuel via the fuel return line to the second fuel tank, by temporarily opening the return line shut-off valve, comprises supplying a predetermined fixed amount of first fuel to the second fuel tank, preferably of between 0, 1 and 2 liter.

In an embodiment, the first fuel subsystem comprises an additive unit which is connected to the first fuel line, preferably upstream of the second first fuel pump and downstream of the first first fuel pump, for supplying additives to a flow of first fuel through the first fuel line, wherein the control system is arranged for operating the additive unit such that at least intermittently, additives are added to a flow of first fuel in the first fuel line, while in first fuel consuming mode. An advantage of the addition of the additive unit is that additives are fed directly into the flow of petrol. As a result, a proper mixture of petrol and additives is achieved. The additive pump is operatively connected to the control system so that the addition of additives to the petrol flow can be controlled by the control system. By adding additives to fuel, for example, and dependent on the specific kind of additive, the octane rating of petrol may be increased, it may act as corrosion inhibitor, and/or as a lubricant.

Preferably, the control system is arranged for adding additives to the first fuel flow by means of the additive unit during or immediately before the above mentioned step of supplying first fuel via the fuel return line to the second fuel tank, by temporarily opening the return line shut-off valve.

Preferably, the control system is further arranged for adding additives to the first fuel flow by means of the additive unit during the above described step of intermittently supplying a volume of first fuel to the high pressure pump while driving in second fuel consuming mode, by intermittently switching to first fuel consuming mode and closing the return line shut-off valve.

In an embodiment of the system wherein additive is added to the second fuel tank in use, preferably in an above mentioned manner, the predetermined minimum relative amount of first fuel in the second fuel tank may be chosen lower, preferably at least one percent, more preferably at least two percent, since in this case the additive also is of positive influence to the engine such as in view of the durability thereof as above described.

The invention also relates to a method for operating a bi-fuel system according to the present invention as described above, wherein the following steps are performed by the control system:

determining whether a relative amount of first fuel in the second fuel tank is less than a predetermined minimum relative amount of first fuel in the second fuel tank (MIX %_min), and if said relative amount is less than MIX %_min, supplying first fuel via the fuel return line to the second fuel tank, by temporarily opening the return line shut-off valve.

If said determined relative amount is however not less than MIX %_min, no action is needed.

Preferably, the following steps are performed for the purpose of the step of determining whether the relative amount of first fuel in the second fuel tank is less than the predetermined minimum relative amount of first fuel in the second fuel tank (MIX %_min):

a) determining a relative amount of first fuel (MIX %) in the second fuel tank, b) comparing MIX % with a predetermined minimum relative amount of first fuel in the second fuel tank (MIX %_min).

The invention also relates to a vehicle comprising a bi-fuel system according to the present invention.

Advantages of the method and vehicle according to the invention are analog to the above described advantages of the bi-fuel system according to the present invention.

The present invention will be explained hereinbelow by means of a preferred embodiment of a system and a method according to the invention, with reference to the following FIGURE, in which FIG. 1 shows an embodiment of a direct injection bi-fuel system for a combustion engine.

The direct injection bi-fuel system 100 according to the present invention as shown in FIG. 1, is arranged for switching between a second fuel—first fuel mixture being provided to the engine during a second fuel consuming mode, and first fuel being provided to said engine during a first fuel consuming mode. The bi-fuel system 100 is arranged to operate with petrol as the first fuel and LPG as the second fuel.

The direct injection bi-fuel system 100 comprises an LPG subsystem 102 as an embodiment of a second fuel subsystem, and a petrol subsystem 102 as an embodiment of a first fuel subsystem.

The LPG subsystem 101 comprises an LPG tank 2 configured to hold a supply of LPG. The pressure of the LPG in the LPG tank 112 may be about 2-16 bar. An LPG pump 4 is mounted in the LPG tank 2. The fuel pump 4 may be any type of fuel pump that can be configured to remove the liquefied gas from the LPG tank 2 via suction and pump the liquefied gas under an elevated pressure, being at least a pressure above the vapor pressure of the LPG, through a fuel supply line 17, through a safety lock-off valve 8, through a pressure limiting non-return valve 20, through an LPG lock-off valve 10, to a junction 19.

The pressure limiting non-return valve 20 as shown in FIG. 1 comprises a non-return valve 20a and a pressure limiting valve 20b. The non-return valve 20a is configured to prevent petrol from entering the LPG subsystem, and the pressure limiting valve 20b is configured to limit the differential system pressure between the lock-off valve 10 and the non-return valve 20a. The lock-off valve 10 is configured to prevent LPG from entering the petrol subsystem 101, which petrol subsystem 101 will be described below. LPG entering the petrol subsystem 101 may cause undesired mixing.

The petrol subsystem 101 comprises a petrol tank 1 configured to hold a supply of petrol. A first petrol pump 3 is mounted in the petrol tank 1 and is configured to remove the petrol from the petrol tank 1 via suction and pump the petrol via a petrol line 9 to a second petrol pump, being formed by a boost pump 6. Boost pump 6 may be used to elevate the pressure of the petrol prior to the petrol entering the junction 19, via a further portion of the petrol line 9. This may be particularly desirable when the fuel consuming mode is switched from the LPG consuming mode to the petrol consuming mode, as discussed in greater detail below. The pressure increase provided by the boost pump 6 in relation with the basic petrol pressure generated by the first petrol pump 3 may be within the range of between about 2 bar and about 10 (or higher) bar, or at least to a pressure above the vapor pressure of the LPG. A non-return valve 7 is configured to prevent LPG from entering the petrol subsystem 101. A petrol shut-off valve 5 is present in a petrol line 9 between the boost pump 6 and the junction 19. Presence of shut-off valve 5 is optional.

The junction 19 joins the LPG subsystem 102 and the petrol subsystem 101 so that the LPG and the petrol may be supplied to the high pressure fuel pump 16 via a fuel line 33 connecting the junction 19 to the low pressure inlet side 31 of the high pressure pump 16. A pressure sensor 21 and a temperature sensor are connected to said fuel, close to the inlet 31 of the high pressure pump 16. In an embodiment, a second pressure sensor 35 may be provided on the LPG tank 2 and be configured to measure the pressure of the liquid fuel inside the LPG tank 2.

The high pressure fuel pump 16 is, via its high pressure outlet 32, connected to a high pressure fuel rail 22 of the direct injection combustion engine. The pressure of the fuel in the high pressure rail 22 may be in the range of about 20 bar to about 200 bar, or more. Although FIG. 1 schematically illustrates a four cylinder combustion engine configuration, the engine 103 may include additional cylinders and/or high pressure pumps.

A LPG return line 18 is operatively connected with an upstream end thereof to the low pressure inlet side 31 of the high pressure pump 16 and is configured to provide a return path for fuel to the LPG tank 2. A non-return valve 11 in the fuel return line is configured to prevent LPG from entering the high pressure fuel pump 16 via return fuel line 18. A return valve, in the present embodiment in the form of a lock-off valve 12, in the fuel return line 18, is configured to allow or prevent petrol from entering the LPG tank 2. A pressure limiting valve 13, which is optional, is configured to limit the differential system pressure between the lock-off valve 12 and the non-return valve 11.

In an embodiment of a system according to the invention in which no high pressure pump 16 is present, the fuel line 33 is connected with its downstream end to the fuel rail of the engine directly. The fuel return line 18 is in that case preferably connected with its upstream end to the fuel rail.

Any LPG that is returned from the high pressure components of the system 100, such as the high pressure fuel pump 16, flows through the return fuel line 18, through a flow limiting element such as in the present embodiment a hydraulic restriction formed by an orifice 14, through a non-return valve 15 and into the LPG tank 2, as illustrated in FIG. 1.

The bi-fuel system 100 further comprises a control system 104 (only schematically displayed and any connection lines not being shown) being operatively connected to the LPG pump 4, the lock-off valves 8, 10, the pressure sensor 21, the lock-off valves 5, 12, and the boost pump 6 and is configured to control whether the mentioned valves are in an open configuration or a closed configuration, and whether the mentioned pumps are on or off. The controller 104 receives data from the pressure sensor 21 and uses the data to control operation of the system via manipulation of the various valves and pumps that the controller 104 communicates with. The fuel pump 3 and the high pressure fuel pump 16 may also be in communication with the controller 104. A switch may also be in communication with the controller 104 and is located in a cabin of the vehicle so that an operator of the vehicle may use the switch to switch between the fuel consuming modes of the system 100. Alternatively or in combination with said switch the controller 104 may comprise a switch algorithm so as to switch between fuel consuming modes autonomously, i.e. based on for example measured values like fuel level in the fuel tanks.

When the combustion engine 103 is running on the petrol, the direct injection bi-fuel system 100 is operating in the petrol consuming mode. In the petrol consuming mode, the petrol pump 3 is on so that the petrol may be pumped from the petrol tank 1. The lock-off valves 10 and 12 are in a closed configuration.

When the combustion engine 103 is running on LPG, the direct injection bi-fuel system 100 is operating in the LPG consuming mode. In the LPG consuming mode, the LPG pump 4 is on so that the LPG may be pumped from the LPG tank 2. The lock-off valve 5 is in the closed configuration, while the lock-off valves 8, 10 and 12 are in the open configuration. Since lock-off valve 12 is open during the LPG consuming mode, LPG is circulated through the system.

When the combustion engine 103 is operating on petrol, and the direct injection bi-fuel system 100 is operating in the petrol consuming mode, the operator of the vehicle can switch to the LPG consuming mode. For the purpose of the mode switch to the LPG consuming mode, the fuel pump 4 will turn on, and the lock-off valves 8, 10, and 12 will be opened.

When the combustion engine 103 is operating on LPG, and the direct injection bi-fuel system 100 is operating in the LPG consuming mode, the driver of the vehicle can switch to the petrol consuming mode. For the purpose of the mode switch to the petrol consuming mode, the boost pump 6 will turn on, the lock-off valve 5 will be opened, the lock-off valves 8, 10 will be closed (after some programmable delay), and the LPG pump 4 will be turned off. The boost pump 6 is used to increase the pressure of the petrol generated by the first petrol pump 3 to about, or above, the pressure of the LPG that was being supplied to the high pressure fuel pump 16 so that the LPG may be flushed, or, purged, from the system 100 via the fuel return line 18. After a delay, the lock-off valve 12 will close. The delay is dependent on physical system parameters. After a second delay, the boost pump 6 will turn off. This second delay is a function of fuel consumption and physical system parameters.

In an embodiment, if it appears that some residual gas fuel is still present in the system, i.e. in the fuel supply line 33 to the high pressure pump, and the low pressure region of the high pressure pump 16, after the lock-off valve 12 is closed as described above, after a predetermined delay, preferably in the range of about 10 to 180 seconds from the above step of closing the lock-off valve 12 and while the boost pump 6 is still switched on, the lock-off valve 12 is opened again for a predetermined time to flush petrol comprising any residual LPG from the fuel supply 33 to the high pressure pump 16 via the return fuel line 18. This proves to be a very effective way of removing residual LPG from the system 100 during the petrol consuming mode. As a consequence, some amount of petrol ends up in the fuel storage tank 2. The result of this method step is that any residual gas fuel is removed from the system 100 in a highly effective manner and thereby the chance of occurrence of vapor lock resulting in stall of the engine is decreased significantly. At the same time or shortly after closing the lock-off valve 12 (the return valve) again, the supplementary fuel pump 6 is switched off as described above.

The bi-fuel system 100 also comprises, as part of the petrol subsystem, an additive unit 30. Additive unit 30 is however not essential within the framework of the present invention. Additive unit 30 comprises a hydraulic connection to the fuel line part 9 between the first petrol pump 3 and the boost pump 6, an additive container, containing fuel additives in liquid form, and an additive pump for pumping additives from the container into said fuel line part via the hydraulic connection. Other locations of the connection to a system fuel line are conceivable, such as for example downstream of the boost pump 6 and petrol shut-off valve 5. The additive pump is operatively connected to the control system 104 so that the addition of additives to the petrol flow can be controlled by the control system. The additive container is configured and located such that it can be refilled, or exchanged, by a vehicle user.

The additive unit 30 can be operated for example such that at regular time intervals and while in first fuel consuming mode, a predetermined amount of additives are added to the first fuel flow to the junction 19.

The control system 104 of the bi-fuel system according to the invention is arranged for determining a relative amount of petrol (MIX %) in the LPG tank 2. For the purpose of determining MIX %, MIX % is recalculated based on a value of MIX % which was previously stored in the memory of the control system and based on a change in amount of liquid fuel in the LPG tank 2 subsequent to said previous storing of MIX %, in particular after an LPG refill operation at a gas station, and which change of amount of liquid fuel is determined by the liquid fuel level sensor 34. The amount of liquid fuel can then be determined by calculating it from a measured fuel level and stored information on the relation between level and volume, which is dependent on the specific fuel tank. Next, MIX % is compared with a predetermined minimum relative amount of petrol in the LPG tank (MIX %_min). If MIX % is less than MIX %_min, i.e. the relative amount of petrol in the LPG tank 2 is lower than desired, the required amount of petrol to be supplied to the LPG tank (V_req) so as to increase MIX % in the LPG tank to at least MIX %_min is determined, and said determined required amount of petrol (V_req) is compared with the maximum amount of fuel that can still be added to the LPG tank (V_max_ad).

If V_req is less than V_max_ad, V_req is supplied via the fuel return line 18 to the LPG tank 2 while in petrol consuming mode (or, by switching thereto), and by temporarily opening the return line shut-off valve 12. Optionally, just before the last-mentioned step, or during said last-mentioned step, a predetermined amount of additives is added to the flow of petrol, so that said additives end up in the LPG tank 2.

The control system 104 comprises a CPU connected to a memory and a comparing unit for comparing values such as MIX % to MIN %_min., the latter being retrieved from the memory by the CPU. The CPU is arranged for performing the method steps as described herein.

The control system 104 is further arranged for determining the amount of petrol flowing through the flow limiting element 14 while petrol is supplied via the fuel return line 18 to the LPG tank 2 while in petrol consuming mode, using the fuel pressure determined by the pressure sensor 21, and a fuel pressure in the LPG tank 2. The fuel pressure sensor 21 is located near the inlet of the high pressure pump 16. The fuel pressure in the LPG tank can be obtained from a mathematical model of the LPG tank 2 as part of the bi-fuel system 100, or from a measured signal from a further fuel pressure sensor arranged for measuring fuel pressure inside the LPG tank 2.

If V_req is however larger than V_max_ad, an amount of petrol equal to V_max_ad is supplied to the LPG tank 2 while in petrol consuming mode, by temporarily opening the return line shut-off valve 12. By doing so, the space, albeit less than optimal, in the LPG tank 2 is used to increase MIX % in the LPG tank 2 as much as possible at that moment. Also in this case, preferably after the step of supplying the amount V_max_ad to the LPG tank 2, intermittently a volume of petrol is supplied to the high pressure pump 16 while driving in LPG consuming mode, by intermittently switching to petrol consuming mode and closing the return line shut-off valve 12, which volume of petrol supplied to the high pressure pump 16 is each time such that in the fuel rail of the engine, MIX % is larger than MIX %_min at all times. By doing so, a lower than desired MIX % in the LPG tank 2 in combination with a for example completely filled LPG tank 2, does not result in the fact that MIX % in the high pressure fuel rail decreases more than desired, since in this case petrol is intermittently supplied directly to the high pressure pump 16 and thus to the high pressure fuel rail. The amount of petrol entering the fuel rail may be determined based on a calculation of consumed fuel while being in petrol consuming mode. Said calculation may be based on stored engine performance maps in combination with measured signals such as engine inlet air pressure, engine speed an throttle information.

The predetermined minimum relative amount of petrol in the LPG tank 2 (MIX %_min) is five percent and this value is stored in the memory of the control system. Dependent on the specific situation a higher minimum relative amount such as up to 10 percent may be set in the control system.

The control system 104, in another embodiment thereof, may be arranged for determining a positive change in the total amount of liquid fuel in the LPG tank 2 using the fuel amount determining means such as the level sensor 34 in the LPG tank 2, or for example using capacitive metering. This is the result of refilling the LPG tank 2 with LPG such as at a gas station. By the determination of the positive change, it follows that the relative amount of petrol in the LPG tank 2 must be decreasing or must have been decreased. This is not desired, and therefore, the control system, following the above step of determining the positive change, is arranged for subsequently supplying petrol via the fuel return line 18 to the LPG tank 2, by temporarily opening the return line shut-off valve 12. Preferably, the mentioned supplied petrol contains additive which was added to the petrol immediately before. The amount of supplied petrol can be set to be 0.25 liter at all times, for example, or can be made dependent on the amount of the positive change. Following the determination of a large change, relatively more petrol may be added to the LPG tank 2 than following the determination of a relatively small change.

The invention claimed is:

1. A bi-fuel system comprising a first, liquid, fuel subsystem and a second, liquefied, fuel subsystem, wherein the system is arranged for switching between a second, liquefied, fuel-first, liquid, fuel mixture being provided to an internal combustion engine during a second, liquefied, fuel consuming mode, and first fuel being provided to said engine during a first, liquid, fuel consuming mode,
    the first fuel subsystem comprising
        a first fuel tank,
        a first fuel pump for pumping first fuel from the first fuel tank through a first fuel line towards a junction,
    the second fuel subsystem comprising
        a second fuel tank, and
        a second fuel pump for pumping second fuel from the second fuel tank through a second fuel line towards the junction,
    the system further comprising:
        a fuel line which is connected with an upstream end thereof, at the junction, to the second fuel line and to the first fuel line, and which is operatively connected with a downstream end thereof to the engine,
        a fuel return line which is operatively connected with an upstream end thereof to the fuel line, a downstream end of the fuel return line opening out into the second fuel tank,
        a return line shut-off valve which is arranged in the fuel return line, wherein in second fuel consuming mode, the shut-off valve is open so that part of the second fuel supplied to the engine is circulated back to the second fuel tank via the fuel return line, and
        a control system which is arranged for performing the following steps:
            determining whether a MIX %, said MIX % being a relative amount of first fuel in the second fuel tank, is less than a MIX %_min, said MIX %_min being a predetermined minimum relative amount of first fuel in the second fuel tank, and
            if said MIX % is less than said MIX %_min, supplying first fuel via the fuel return line to the second fuel tank, by temporarily opening the return line shut-off valve.

2. A system according to claim 1, wherein the control system, for the purpose of determining whether the relative amount of first fuel in the second fuel tank is less than the (MIX %_min), is arranged for performing the following steps:
    a) determining the MIX % in the second fuel tank, and
    b) comparing the MIX % with the MIX % min.

3. A system according to claim 2, wherein the second fuel subsystem further comprises fuel amount determining means, arranged for determining the total amount of liquid fuel in the second fuel tank, and the control system, for the purpose of performing step a), is arranged for determining MIX % by recalculating MIX % based on a value of MIX % which was previously stored in a memory of said control system and based on a change in said amount of liquid fuel in the second fuel tank subsequent to said previous storing of MIX %, which change of said amount of liquid fuel is determined by the fuel amount determining means.

4. A system according to claim 2, wherein the control system is arranged for performing the following additional steps if during step b) it is established that MIX % is less than MIX %_min:
    determining V_req, V_req being the required amount of first fuel to be supplied to the second fuel tank so as to increase MIX % in the second fuel tank to at least MIX %_min,
    comparing said determined V_req with a V_max_ad, V_max_ad being the maximum amount of fuel that can still be added to the second fuel tank, and
    if V_req is larger than V_max_ad, intermittently supplying a volume of first fuel to the high pressure pump while driving in second fuel consuming mode, by intermittently switching to first fuel consuming mode and closing the return line shut-off valve, which volume of first fuel supplied to the high pressure pump is each time such that in the fuel rail, MIX % is larger than MIX %_min at all times.

5. A system according to claim 4, wherein the control system, if V_req is larger than V_max_ad, is arranged for, additional to the step of intermittently supplying a volume of first fuel to the high pressure pump,
    supplying an amount of first fuel equal to V_max_ad to the second fuel tank while in first fuel consuming mode, by temporarily opening the return line shut-off valve.

6. A system according to claim 2, wherein the control system, for the purpose of supplying first fuel via the fuel return line to the second fuel tank, by temporarily opening the return line shut-off valve, is arranged for supplying first fuel via the fuel return line to the second fuel tank while in first fuel consuming mode, by temporarily opening the return line shut-off valve.

7. A system according to claim 1, wherein the control system, for the purpose of supplying first fuel via the fuel return line to the second fuel tank, by temporarily opening the return line shut-off valve, is arranged for supplying first fuel via the fuel return line to the second fuel tank while in first fuel consuming mode, by temporarily opening the return line shut-off valve.

8. A system according to claim 1, wherein the first fuel pump is constituted by a primary fuel pump which is provided in the first fuel tank, and wherein the system further comprises:
    a secondary fuel pump connected in series to the primary fuel pump for increasing first fuel pressure generated by the primary fuel pump, so that by means of the primary and secondary fuel pumps, in use first fuel from the first fuel tank can be pumped through the first fuel line towards the junction.

9. A system according to claim 1, wherein the system is a direct injection bi-fuel system, and further comprises:
- a high pressure pump having an inlet and a high pressure outlet, the outlet being connected to a high pressure fuel rail of the engine, wherein
- the fuel line is connected with the upstream end thereof, at the junction, to the second fuel line and to the first fuel line, and connected with the downstream end thereof to the inlet of the high pressure pump, and wherein
- the fuel return line is operatively connected with the upstream end to the fuel line at or near the inlet of the high pressure pump.

10. A system according to claim 1, wherein the first fuel subsystem further comprises
- a first fuel shut-off valve being arranged in the first fuel line, the second fuel subsystem further comprises
- a second fuel shut-off valve being arranged in the second fuel line, and
- the system further comprises
  - a flow limiting element arranged in the return line, arranged for limiting flow through the return line, and
  - a pressure sensor connected to the hydraulic circuit part between the first fuel shut-off valve, the second fuel shut-off valve and the flow limiting element, for determining fuel pressure in said circuit part,
- wherein the control system is further arranged for determining the amount of first fuel flowing through the flow limiting element during said supplying first fuel via the fuel return line to the second fuel tank, by temporarily opening the return line shut-off valve, using the fuel pressure determined by the pressure sensor, and a fuel pressure in the second fuel tank.

11. A system according to claim 1, wherein the MIX %_min is five percent.

12. A system according to claim 1, wherein the first, liquid, fuel is petrol, and wherein the second, liquefied, fuel is liquified petroleum gas.

13. A system according to claim 1, wherein the first fuel subsystem comprises an additive unit which is connected to the first fuel line, for supplying additives to a flow of first fuel through the first fuel line, wherein the control system is arranged for operating the additive unit such that at least intermittently, additives are added to a flow of first fuel in the first fuel line, while in first fuel consuming mode.

14. A method for operating the bi-fuel system of claim 1, wherein the following steps are performed by the control system:
- determining whether said MIX % is less than said MIX % min, and
- if said MIX % is less than said MIX %_min, supplying first fuel via the fuel return line to the second fuel tank, by temporarily opening the return line shut-off valve.

15. The method of claim 14, wherein the following steps are performed by the control system for the purpose of the step of determining whether aid MIX % is less than said MIX % min:
- a) determining said MIX %,
- b) comparing said MIX % with said MIX %_min.

16. A vehicle comprising a bi-fuel system according to claim 1.

* * * * *

UNITED STATES PATENT AND TRADEMARK OFFICE
CERTIFICATE OF CORRECTION

PATENT NO. : 9,581,093 B2  
APPLICATION NO. : 14/954735  
DATED : February 28, 2017  
INVENTOR(S) : Sebastiaan M. E. ten Broeke et al.

Page 1 of 1

It is certified that error appears in the above-identified patent and that said Letters Patent is hereby corrected as shown below:

In the Claims

Column 12, Line 2:
"(MIX %_min), is arranged for performing the following" should read, --MIX %_min, is arranged for performing the following--.

Column 14, Line 26:
"step of determining whether aid MIX % is less than said" should read, --step of determining whether said MIX % is less than said--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*